US009851066B2

(12) United States Patent
Kropac et al.

(10) Patent No.: US 9,851,066 B2
(45) Date of Patent: Dec. 26, 2017

(54) REFLECTOR SIGNAL LAMP HAVING A HIDDEN LIGHT SOURCE

(75) Inventors: Miroslav Kropac, Ostrava (CZ); Jan Kratochvil, Novy Jicin (CZ); Ludek Mazal, Bilovec (CZ); Martin Dluhos, Novy Jicin (CZ); Pavel Tuma, Novy Jicin (CZ)

(73) Assignee: VARROC LIGHTING SYSTEMS S.R.O., Senov U Nového Jicina (CZ)

( * ) Notice: Subject to any disclaimer, the term of this patent is extended or adjusted under 35 U.S.C. 154(b) by 1065 days.

(21) Appl. No.: 13/527,710

(22) Filed: Jun. 20, 2012

(65) Prior Publication Data

US 2012/0327680 A1 Dec. 27, 2012

(30) Foreign Application Priority Data

Jun. 23, 2011 (CS) ..................................... 2011-372

(51) Int. Cl.
*B60Q 1/00* (2006.01)
*F21S 8/10* (2006.01)

(52) U.S. Cl.
CPC ......... *F21S 48/215* (2013.01); *F21S 48/2237* (2013.01); *F21S 48/2262* (2013.01); *F21S 48/2268* (2013.01); *F21S 48/2281* (2013.01); *F21S 48/24* (2013.01)

(58) Field of Classification Search
CPC . F21V 7/06; F21V 7/04; F21S 48/2262; F21S 48/2268; F21S 48/24
USPC .......................... 362/511, 494, 552; 313/113
See application file for complete search history.

(56) References Cited

U.S. PATENT DOCUMENTS

| | | | | |
|---|---|---|---|---|
| 5,647,657 | A | 7/1997 | Damasky et al. | |
| 8,278,806 | B1 * | 10/2012 | Moskowitz | 313/113 |
| 2002/0114166 | A1 * | 8/2002 | Muller et al. | 362/541 |
| 2009/0284365 | A1 * | 11/2009 | Wagner et al. | 340/465 |
| 2012/0147624 | A1 * | 6/2012 | Li et al. | 362/609 |

FOREIGN PATENT DOCUMENTS

| | | | |
|---|---|---|---|
| CN | 1319740 | A | 10/2001 |
| CN | 200954799 | Y | 10/2007 |
| CN | 101622723 | A | 1/2010 |
| CN | 1480679 | A | 3/2014 |
| DE | 4439547 | A1 | 5/1996 |
| JP | 2002050210 | A | 2/2002 |

OTHER PUBLICATIONS

Chinese Office Action for related Chinese Application No. CN2012102082596, dated Jun. 15, 2015, 6 pages.
English Translation of Chinese Office Action for related Chinese Application No. CN2012102082596, dated Jun. 15, 2015, 5 pages.

* cited by examiner

*Primary Examiner* — Karabi Guharay
(74) *Attorney, Agent, or Firm* — Cantor Colburn LLP

(57) ABSTRACT

A signal lamp for a front and rear lighting of a vehicle includes at least one light source for emitting light, wherein the at least one light source is hidden from view; a reflector for reflecting the light emitted by the at least one light source away from the vehicle; and at least one light guide disposed between the reflector and a cover of the signal lamp, the at least one light guide having a first end and a second end, wherein the first end is disposed adjacent the at least one light source and the second end is located adjacent a focus point of the reflector.

20 Claims, 3 Drawing Sheets

REFLECTOR SIGNAL LAMP HAVING A HIDDEN LIGHT SOURCE

CROSS-REFERENCE TO RELATED APPLICATION

This application claims the benefit of Czech Republic Patent Application No. PV 2011-372 filed Jun. 23, 2011, the entire disclosure of which is hereby incorporated herein by reference.

FIELD OF THE INVENTION

This invention pertains to a reflector signal lamp with a hidden light source, and more particularly to a reflector signal lamp with a hidden light source for a front and rear signal lighting of motor vehicles.

BACKGROUND OF THE INVENTION

Presently, signal lamps are used for front and rear running lights, brake lights, turn indicator lights, backup lights or fog lights in external automobile lighting. An optical system of the signal lamp, typically, includes a light source, a reflector, one or more optical filters, and an exterior lens.

The light sources used are bright incandescent light bulbs or light emitting diodes (LEDs).

Typically, there are two types of optical systems: direct and indirect.

A direct optical system has a visible light source situated approximately in a middle of a reflector. A direction of reflected light is in a direction of an axis of the light source.

On the other hand, indirect optical system has a visible light source situated at a side of a reflector, while a direction of reflected light is approximately perpendicular to an axis of the light source.

A certain portion of light emitted by the light source cannot be effectively reflected and is lost as direct light, thereby decreasing an efficiency of the optical system. Further, the light source can be easily recognized as a relatively bright object against a darker background of a reflecting surface of the reflector.

It would be desirable to produce a signal lamp having a hidden light source, wherein the light source is not visible from any direction, while a light emitting surface of the reflector is sufficiently visible.

SUMMARY OF THE INVENTION

In concordance and agreement with the present invention, a signal lamp having a hidden light source, wherein the light source is not visible from any direction, while a light emitting surface of the reflector is sufficiently visible, has been surprisingly invented.

In one embodiment, a signal lamp for a vehicle, comprises: at least one hidden light source for emitting light; a reflector for reflecting the light emitted by the at least one light source away from the vehicle; and at least one light guide disposed between the reflector and a cover of the signal lamp to direct the light emitted by the at least one light source onto the reflector.

In another embodiment, a signal lamp, comprises: at least one hidden light source for emitting light; a reflector for reflecting the light emitted by the at least one light source; and at least one light guide disposed between the reflector and a cover of the signal lamp to direct the light emitted by the at least one light source onto the reflector, the at least one light guide having a first end and a second end, wherein the first end is disposed adjacent the at least one light source and the second end is located adjacent a focus point of the reflector.

In yet another embodiment, a signal lamp, comprises: at least one light source for emitting light, wherein the at least one light source is hidden from view by a frame of the signal lamp; a reflector for reflecting the light emitted by the at least one light source, wherein the reflector includes at least one parabolic surface; and at least one light guide disposed between the reflector and a cover of the signal lamp to direct the light emitted by the at least one light source onto the reflector.

The essence of the invention being that at least one light source is arranged at an outer peripheral edge of a reflector behind a frame, which peripheral shape corresponds to a shape of the outer peripheral edge of the reflector, and which is made of nontransparent material, while a light guide has an exit end located at a focus point of the reflector. Moreover, the exit end of the light guide is configured as a light scattering component. The light guide also has an entry end configured as a collimation component.

Furthermore, the at least one light source of the signal lamp is an incandescent bulb or LED, and the LED is located on a rigid board provided with printed circuits. A number of the light sources corresponds to a number of light guide branches. The reflector includes a partly or fully light-reflecting surface. The reflector also includes one or more parabolic surfaces, which can be provided with light scattering elements.

BRIEF DESCRIPTION OF THE DRAWINGS

The above, as well as other advantages of the present invention, will become readily apparent to those skilled in the art from the following detailed description of the preferred embodiment when considered in the light of the accompanying drawings in which.

DETAILED DESCRIPTION OF EXEMPLARY EMBODIMENTS OF THE INVENTION

The following detailed description and appended drawings describe and illustrate various embodiments of the invention. The description and drawings serve to enable one skilled in the art to make and use the invention, and are not intended to limit the scope of the invention in any manner.

Figure 1:
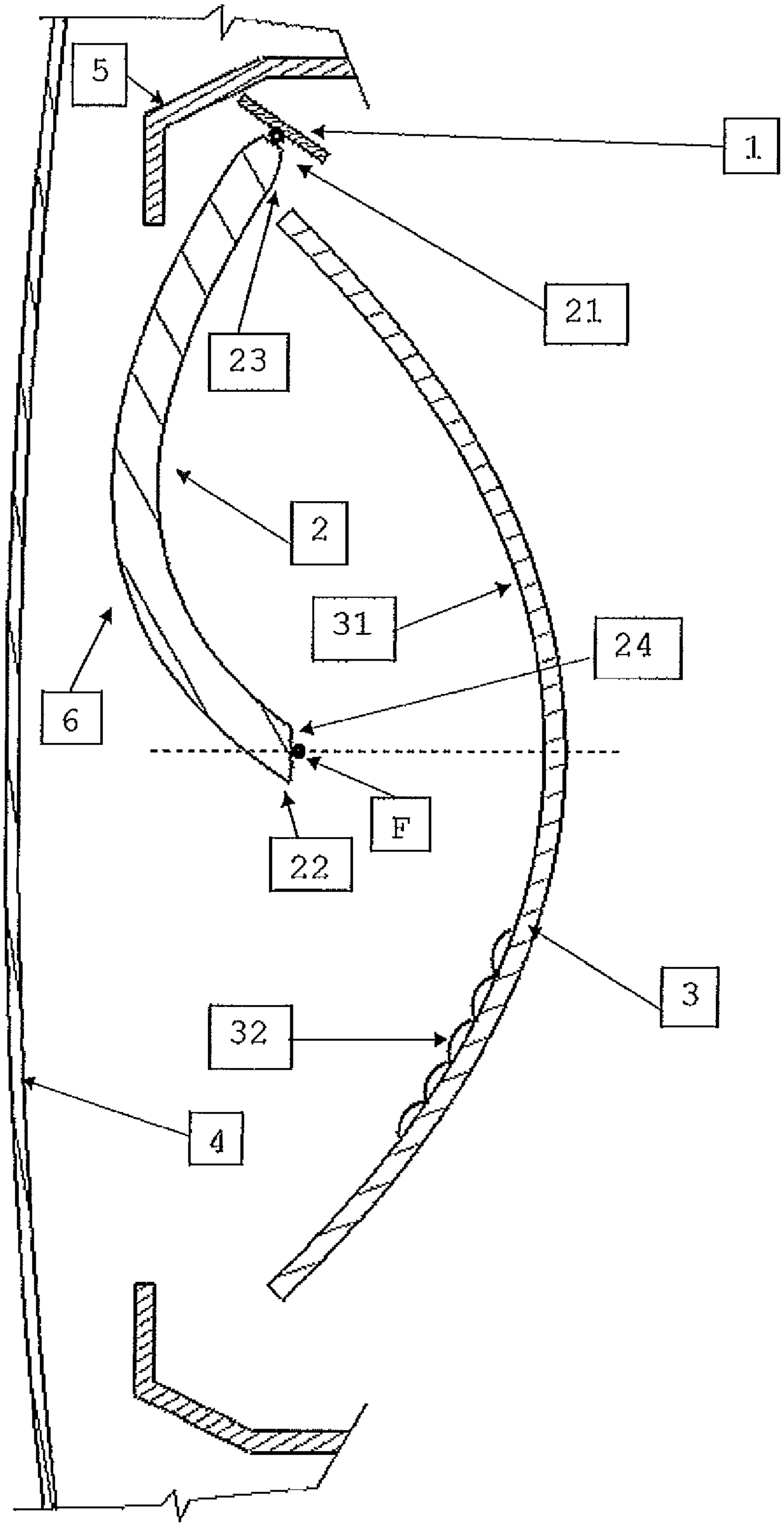
FIG. 1 is a schematic cross-sectional view of a signal lamp according to embodiment of the inventions, wherein the signal lamp has one hidden light source.

FIG. 1 illustrates a signal lamp including an optical system according to an embodiment of the invention. The optical system includes a light source 1, a light guide 2, a frame 5, a reflector 3, and a cover 4. It is understood that the cover 4 can be formed from any suitable material such as a glass material, for example. Light emitted by the light source 1 is collimated and directed by the light guide 2 to the reflector 3, where the light is reflected on a first surface 31 and directed through the cover 4.

Figure 2:
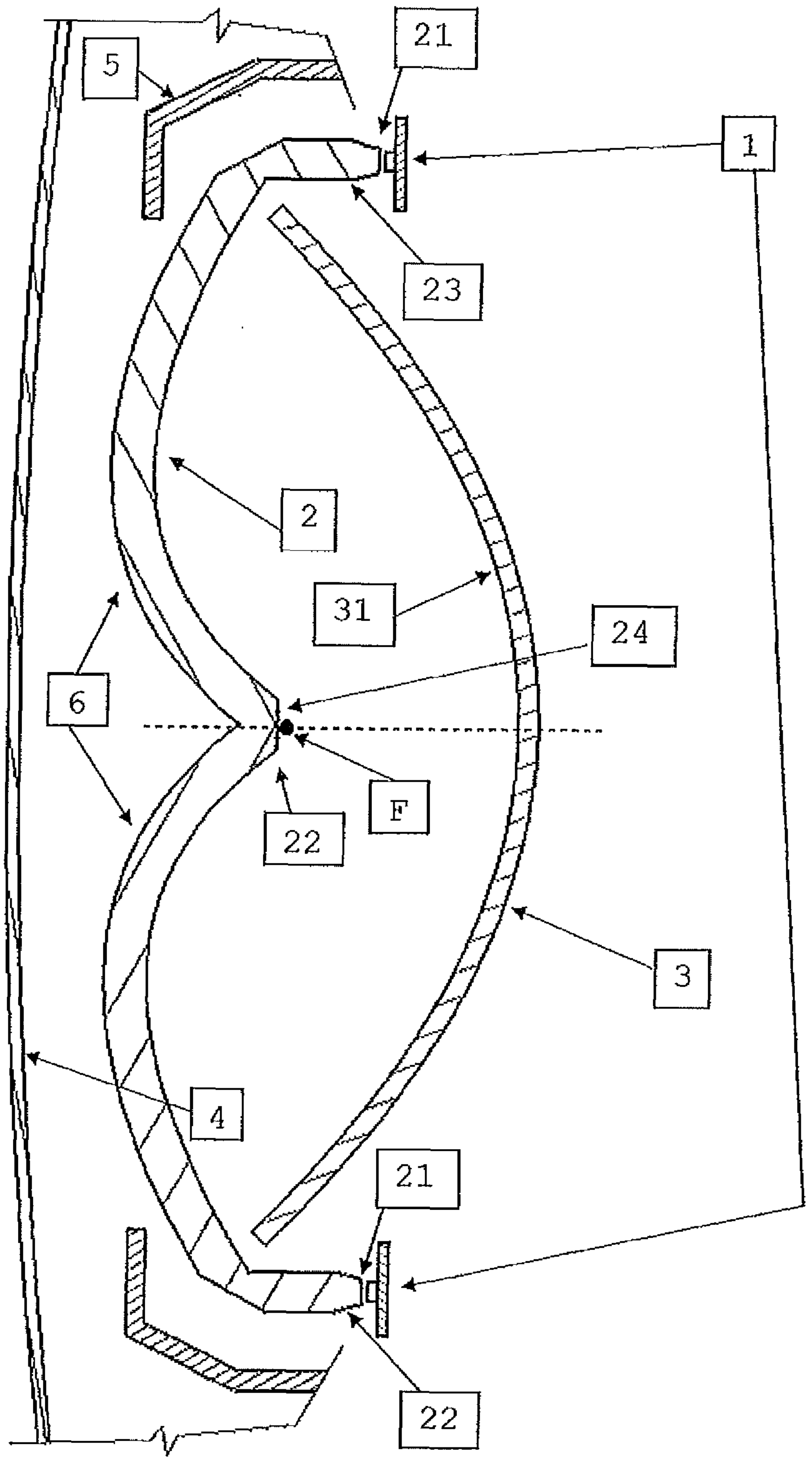
FIG. 2 is a schematic cross-sectional view of a signal lamp according to another embodiment of the invention, wherein the signal lamp has two hidden light sources.
Figure 3A:
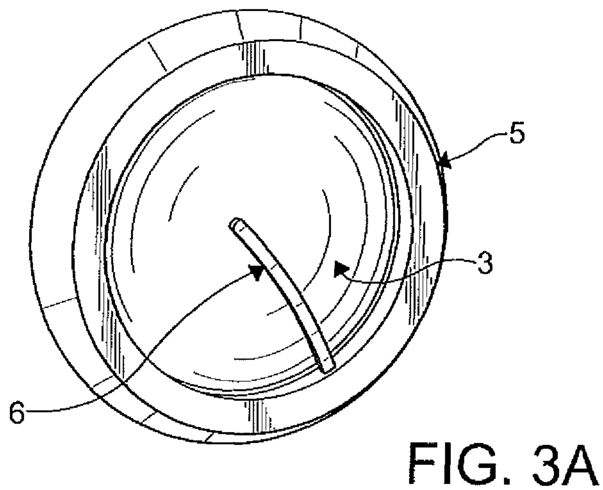
FIG. 3A is a front elevational view of the signal lamp illustrated in FIG. 1.
Figure 3B:
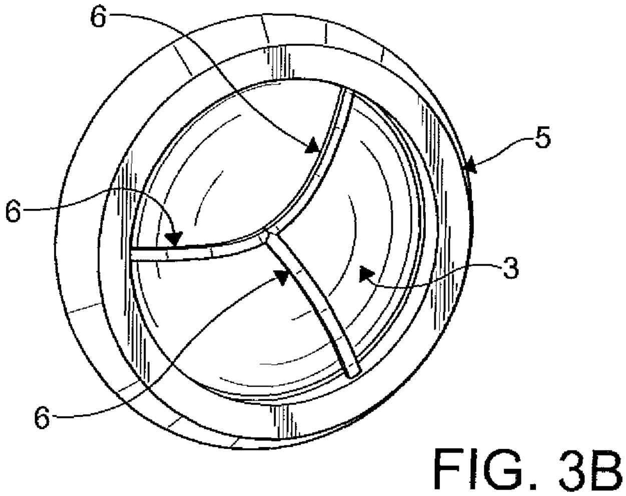
FIG. 3B is a front elevational view of a signal lamp according to another embodiment of the invention, wherein the signal lamp has three hidden light sources.
Figure 3C:
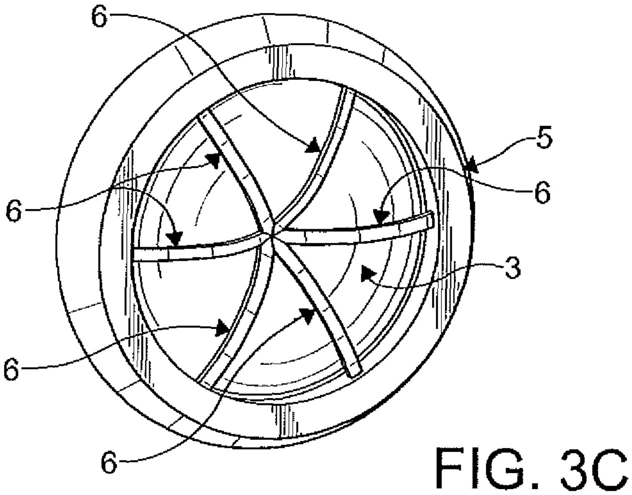
FIG. 3C is a front elevational view of a signal lamp according to another embodiment of the invention, wherein the signal lamp has six hidden light sources.

In certain embodiments, the light source 1 is a bright incandescent light bulb of the reflector 3 or light emitting diode (LED), which is placed around an edge of the signal lamp behind a frame 5, for example. As shown in FIG. 2, additional light sources 1 and light guides 2 can be employed if desired. For example, a single light source 1 is used in FIG. 3A, three light sources 1 are used in FIG. 3B, and six light sources are used in FIG. 3C. It is understood that the frame 5 can be made of any suitable material such as a nontransparent material.

An entry end 21 of the light guide 2 is configured as a collimation component 23. The collimation component 23 can be an optical collimator or a Fresnel lens which produces a collimated beam of light for a propagation of light in the light guide 2 without losses, for example.

An exit end 22 of the light guide 2, situated near a focus point F of the reflector 3, is configured as a light scattering component 24. The light scattering component 24 includes optical grooves, prisms, or other optical elements used to produce an evenly scattered light beam from the light guide 2 to the first surface 31 of the reflector 3 to increase a size of an light emitting surface.

The light guide 2 includes a plurality of branches 6. A number of the branches 6 is based upon a number of the light sources 1. It is understood that the light sources 1 can be LEDs placed on a rigid board with printed circuits in a single plane, as shown in FIG. 2.

As illustrated in FIG. 1, the first surface 31 of the reflector 3 is provided with a partly or fully reflective coating. The first surface 31 of the reflector 3 may be configured as a single parabolic surface or several parabolic surfaces having light scattering elements 32 formed therein. The light scattering elements 32 can improve a homogeneity of illumination of an illuminated surface of the reflector 3 and an overall visibility.

A size of the reflector 3 of the signal lamp depends on a type of signal function being provided. The signal lamps shown in FIGS. 1-3C produce sufficient light and a light scattering for a reflector 3 with the associated light guide 2.

When the LEDs are used as the light source 1, or light sources 1, in combination with a properly arranged light guide 2, and a main portion of the light emitted by the light source 1, or light sources 1, is properly utilized. Therefore, light losses for the light source 1, or light sources 1, are minimized. The signal lamp according to the invention is more efficient than signal lamps of the prior art.

Further, the reflector signal lamp with the hidden light source 1 in an on and off state is distinguishable from the signal lamps of the prior art.

The signal lamp having a hidden light source 1 has been developed to meet requirements of light division, light color and optimal composition of the light emitting surfaces, while maintaining safe signal registration.

What is claimed is:

1. A signal lamp for a vehicle, comprising:
- a housing having a cover configured to allow light to pass therethrough;
- a nontransparent frame disposed within the housing;
- at least one hidden light source for emitting light, the at least one hidden light source disposed within the housing behind the nontransparent frame such that the light source is not visible from any direction outside the housing;
- a reflector for reflecting the light emitted by the at least one light source away from the vehicle; and
- at least one light guide disposed between the reflector and the cover to direct the light emitted by the at least one light source onto the reflector.

2. The signal lamp according to claim 1, wherein the frame is shaped to correspond to a shape of an outer peripheral edge of the reflector.

3. The signal lamp according to claim 1, wherein the at least one light source is disposed adjacent an outer peripheral edge of the reflector.

4. The signal according to claim 1, wherein the at least one light source is an incandescent bulb.

5. The signal lamp according to claim 1, wherein the at least one light source is a light emitting diode.

6. The signal lamp according to claim 5, the light emitting diode is disposed on a printed circuit board.

7. The signal lamp according to claim 1, wherein a first end of the at least one light guide is configured as a collimation component.

8. The signal lamp according to claim 1, wherein a second end of the at least one light guide comprises a light scattering component to produce an evenly scattered light beam, the light scattering component comprising at least one of optical grooves, prisms, or optical elements.

9. The signal lamp according to claim 1, wherein a number of the at least one light source corresponds to a number of the at least one light guide.

10. The signal lamp according to claim 1, wherein a number of the at least a portion of a surface of the reflector includes at least one of a partially reflective coating and a fully reflective coating disposed thereon.

11. The signal lamp according to claim 1, wherein the reflector includes at least one parabolic surface.

12. The signal lamp according to claim 1, wherein the reflector includes at least one light scattering element purposely formed thereon to evenly distribute light.

13. The signal lamp of claim 1, wherein the nontransparent frame is annular, the at least one light guide extending radially from the frame to a center point of the annular frame.

14. A signal lamp, comprising:
- at least one hidden light source for emitting light;
- a reflector for reflecting the light emitted by the at least one light source, the reflector having a convex surface and a concave surface defining a focus; and
- at least one light guide disposed between the reflector and a cover of the signal lamp to direct the light emitted by the at least one light source onto the reflector, the at least one light guide having a first end and a second end, wherein the first end is disposed adjacent the at least one light source and the second end including an end surface oriented facing toward the reflector concave surface and located at the focus.

15. The signal lamp according to claim 14, wherein the first end of the at least one light guide is configured as a collimation component.

16. The signal lamp according to claim 14, wherein the second end of the at least one light guide is configured as a light scattering component.

17. The signal lamp according to claim 14, wherein the at least one light guide includes a concave surface and a convex surface, wherein the light guide concave surface and the reflector concave surface face toward each other.

18. A signal lamp, comprising:

at least one light source for emitting light, wherein the at least one light source is hidden from view by a frame of the signal lamp;

a reflector for reflecting the light emitted by the at least one light source, wherein the reflector includes at least one parabolic surface; and at least one light guide disposed between the reflector and a cover of the signal lamp to direct the light emitted by the at least one light source onto the reflector, the at least one light guide comprising a first end disposed at the at least one light source and a second end disposed between the cover and the reflector, wherein the light emitted by the at least one light source enters the first end and does not exit the at least one light guide until the second end.

19. The signal lamp according to claim 18, wherein the reflector includes at least one light scattering element formed thereon.

20. The signal lamp according to claim 18, wherein at least a portion of a surface of the reflector includes at least one of a partially reflective coating and a fully reflective coating disposed thereon.

* * * * *